(No Model.) 2 Sheets—Sheet 1.
H. FINK.
FEED BAG FOR HORSES.
No. 347,929. Patented Aug. 24, 1886.
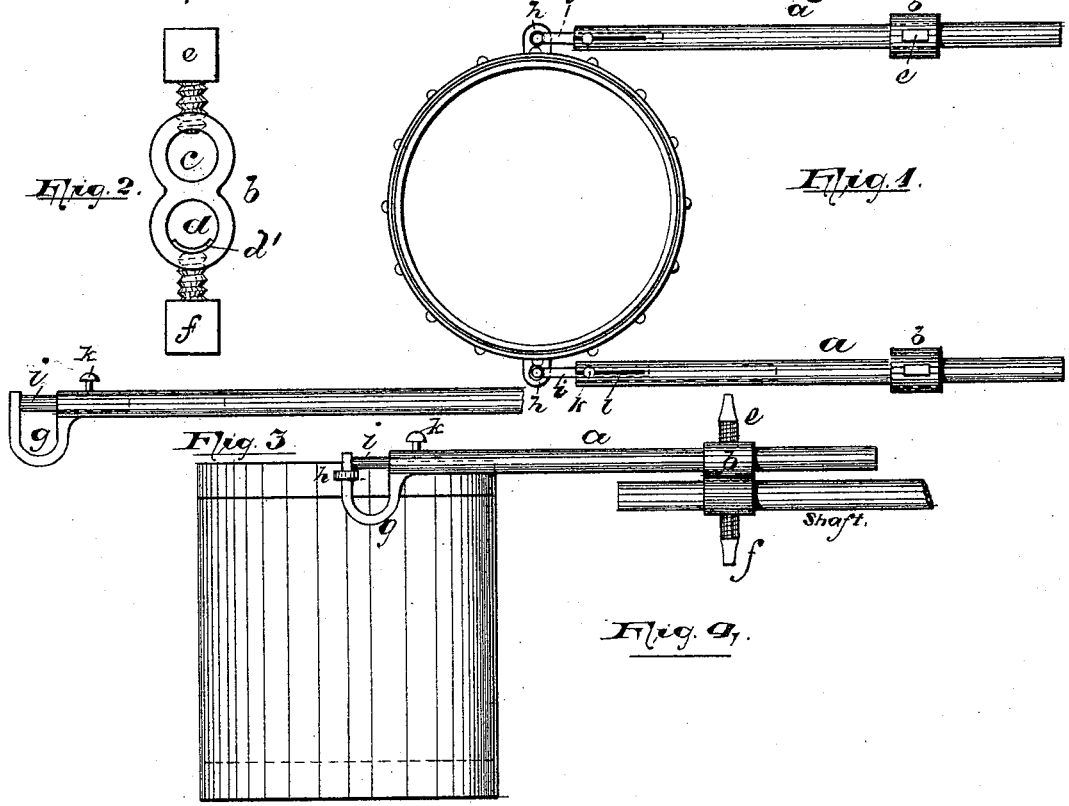
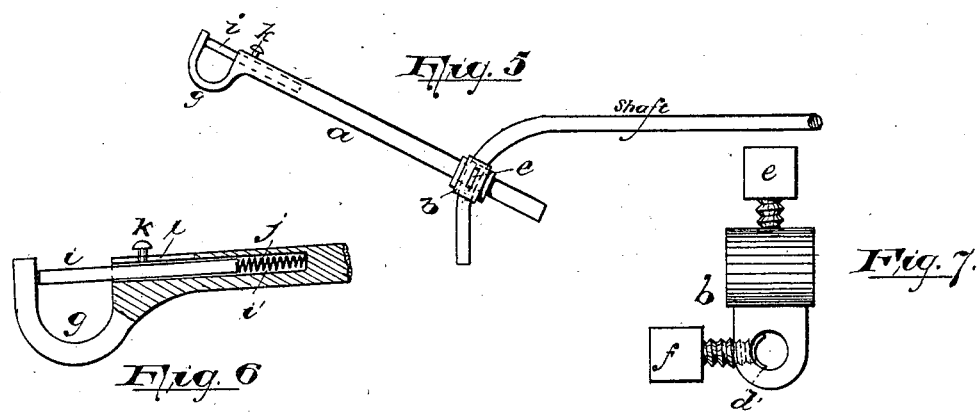
WITNESSES:
Fred C. Fraentzel
Fredk. F. Campbell
INVENTOR:
Henry Fink,
BY Drake & Co. ATTYS.

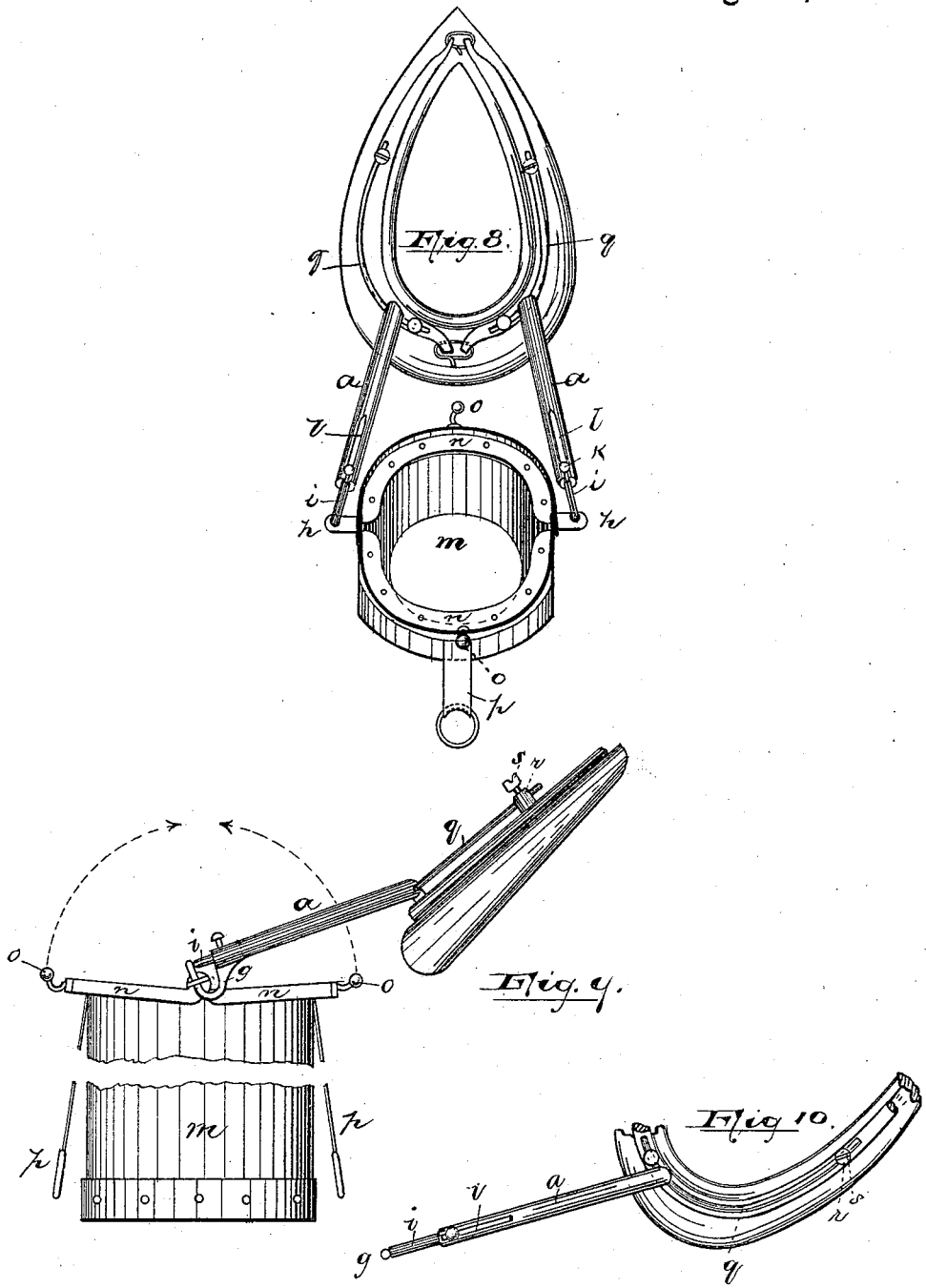

UNITED STATES PATENT OFFICE.

HENRY FINK, OF NEWARK, NEW JERSEY.

FEED-BAG FOR HORSES.

SPECIFICATION forming part of Letters Patent No. 347,929, dated August 24, 1886.

Application filed May 3, 1886. Serial No. 200,968. (No model.)

*To all whom it may concern:*

Be it known that I, HENRY FINK, a citizen of the United States, residing at Newark, in the county of Essex and State of New Jersey, have invented certain new and useful Improvements in Feed-Bags for Horses; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide more convenient means for feeding horses while they are standing in harness before the vehicle to which they are attached, and means that will be more comfortable for the horses while feeding, and will not cause them to throw, and thus waste, the feed.

The invention consists in the arrangements and combinations of parts, substantially as will be hereinafter set forth, and finally embodied in the clauses of the claims.

Referring to the accompanying drawings, in which like letters indicate corresponding parts in each of the several figures, Figure 1, Sheet 1, is a plan of the device as constructed to be coupled to the shafts of a wagon or carriage. Fig. 2 is an end view of a coupling-piece in detail. Fig. 3 is a side view of one of the arms used for holding the feed-receptacle forward from the shaft. Fig. 4 is a side elevation showing the feeding device coupled to the shaft. Fig. 5 illustrates a slight modification, by means of which the device may be coupled to curved or bent shafts. Fig. 6 is a sectional view of a portion of one of said holding-arms, showing more clearly the construction by means of which the feed-receptacle is secured in place; and Fig. 7 represents a modified coupling adapted for use with the said bent shaft. On sheet 2, Fig. 8 is a perspective front view of the device applied to a horse's collar, for use when the horse is harnessed to a heavy vehicle having a center-pole. Fig. 9 is a side view of the same, and Fig. 10 is a detail view of one of the arms secured to the collar.

In said drawings, $a\, a$ are arms which project forward at each side of the horse, either from the carriage-shafts or from the collar or other harness part independent of the head of the horse, to allow the horse to move his head freely without at the same time disturbing the feed bag or receptacle. The arms, when attached to the shafts, are secured by means of couplers $b$, which are preferably perforated, as at $c\, d$, to receive the holding-arms $a$ and the shaft, which parts are held immovably in said couplers by means of set-screws or clamps $e\, f$, the point of the shaft being protected from injury by means of a protecting-plate, $d'$, arranged in the perforation $d$, against which the clamp bears or may bear.

By having independent perforations and fastening devices to receive and hold the arms and shafts I am enabled to remove the arms from the shaft without loosening the coupler from one or the other of said parts, so that the coupling-piece is not liable to be lost or disarranged.

At the outer extremities of the arms $a\, a$ are formed hooks $g$, upon which the feed-receptacle between the arms is removably suspended, said receptacle being provided at each side with eyes $h$, through which the said hooks pass. By this construction the bag may be detached from the horse or vehicle for replenishment or other purposes without disturbing the supporting-arms. The bag or receptacle is held upon said hooks by means of suitable stays, $i$, which preferably slide in recesses $i'$, formed longitudinally in said arms, springs $j$ being arranged in said recesses to project the stay or tongue $i$ across the opening to the hook, as will be understood. The stays are or may be provided with finger-pieces $k$, which work in slots $l$, and enable the stay to be repressed with ease.

The feed-receptacle $m$ may be an ordinary canvas bag with a wooden bottom; but I prefer the construction shown in Figs. 8 and 9, in which such a bag-body is shown with hinged sections $n\, n$ at the mouth connected together by pivots which provide the eyes $h$ to receive the hooks of the supports or arms $a\, a$. Said sections are provided with suitable catches or locks, $o\, o$, adapted to hold the sections together, and the bag closed to retain the feed more securely therein when not in use. The receptacle is also provided with suitable rings, eyes, or other suitable devices, $p$, by means of which the device may be suspended from suitable hooks upon or beneath the vehicle. When the arms are secured to the collar, I prefer to weld or otherwise unite them to rods $q\ q$, which are bent to conform to the hame, said rods being adjustably secured to said hame by means of suitable eye-studs and set-screws, $r$ and $s$.

Having thus described the invention, what I claim as new is—

1. In a feeding device, the combination of a feed-receptacle, $m$, arms $a\ a$, couplings $b$, having independent perforations adapted to receive the shafts of a vehicle and said arms, and set-screws or clamps, substantially as set forth.

2. The feeding device herein shown, combining therein a bag or receptacle having hinged sections with suitable clasps, eyes $h$, and suspending eyes $p$, hooked arms provided with spring-actuated stays and finger-pieces, and couplers provided with protecting-plates, and set-screws or clamps, substantially as herein set forth.

3. In a feeding device, the feed-bag combining therein a body, hinged sections $n\ n$ at the mouth thereof, and eyes $h$ at the pivotal ends of said sections, to receive the hooks of the supporting-arms, substantially as set forth.

In testimony that I claim the foregoing I have hereunto set my hand this 23d day of April, 1886.

HENRY FINK.

Witnesses:
    CHARLES H. PELL,
    FREDK. F. CAMPBELL.